United States Patent [19]

Prout

[11] 3,837,010
[45] Sept. 24, 1974

[54] PROSTHETIC ELBOW WITH RESILIENT LOCKING ASSEMBLY

[75] Inventor: Wesley C. Prout, Kankakee, Ill.
[73] Assignee: Parke, Davis & Company, Detroit, Mich.
[22] Filed: Mar. 5, 1973
[21] Appl. No.: 338,281

Related U.S. Application Data

[63] Continuation-in-part of Ser. No. 235,054, March 16, 1972, abandoned.

[52] U.S. Cl. ........................................ 3/12.3, 3/26
[51] Int. Cl. .............................................. A61f 1/06
[58] Field of Search ........................... 3/12–12.8, 3/22–29, 2; 287/14, 99; 128/80 F

[56] References Cited
UNITED STATES PATENTS

| | | | |
|---|---|---|---|
| 2,553,830 | 5/1951 | Motis | 3/12.3 |
| 2,637,042 | 5/1953 | Threewit | 3/12.2 |
| 2,749,557 | 6/1956 | Riddle | 3/33 |

FOREIGN PATENTS OR APPLICATIONS

| | | | |
|---|---|---|---|
| 510,831 | 9/1920 | France | 3/26 |
| 709,901 | 5/1931 | France | 3/12 |

Primary Examiner—Richard A. Gaudet
Assistant Examiner—Ronald L. Frinks
Attorney, Agent, or Firm—Christie, Parker & Hall

[57] ABSTRACT

A prosthetic elbow for an amputee. First and second connector parts are adapted to be connected to an artificial upper arm and an artificial lower arm, respectively, for the amputee. The second connector part is rotatably mounted on the first connector part. A lock is used for selectively stopping the rotation between the first and second connector parts and comprises: a gear assembly having an outer gear part with gear teeth therein; a hub separate from and for the gear part; means rigidly connecting the hub to one of the connector parts; a resilient member connected to the gear part and hub and providing therebetween a resilient mounting; a locking member; means for movably mounting the locking member on the other of the connector parts so as to enable selective engagement between the locking member and gear teeth to thereby stop relative rotation, through the resilient means, of the first and second connector parts. The locking member is selectively moved into and out of engagement with the gear teeth.

16 Claims, 6 Drawing Figures

3,837,010

PROSTHETIC ELBOW WITH RESILIENT LOCKING ASSEMBLY

CROSS-REFERENCE TO RELATED APPLICATION

This application is a continuation-in-part of my co-pending application Ser. No. 235,054 filed Mar 16, 1972 and entitled "Prosthetic Assembly with Resilient Locking Part," and now abandoned.

BACKGROUND OF THE INVENTION

The present invention relates to a prosthetic assembly having relatively movable connector parts with a lock between the connector parts.

Prosthetic elbow units for the above-the-elbow amputees are known. One particular type of prosthetic elbow unit is of the positive lock or gear sector lock type disclosed in Section 1.1.1.3.7 of the book entitled Final Report on Artificial Arm and Leg Research Development, published by Northrop Aircraft, Inc. in 1951.

The aforementioned prosthetic elbow unit consists of a yoke attached to the turntable of an upper arm socket. A serrated shaft is connected to the forearm and is rigidly connected to a serrated sector gear. The sector gear rotates with the forearm through 135° and has inclined teeth. A lock lever is pivoted on the opposite side of the yoke from the sector gear so that the end of the lever drops in between the teeth on the sector gear. The cam lifts and lowers the lock lever to engage and disengage the teeth of the sector gear. The cam is rotated through a ratchet lever which in turn is actuated by an elbow lock cable. A spring moves the ratchet lever back to its original position after each cycle, ready for the next cycle. A tubular rubber bumper is affixed on a stop rod which extends in between the sides of the yoke and the sector gear strikes the bumper at the 0° and 135° rotational positions, thereby limiting its angle of rotation. The overall unit is housed in a laminated plastic cap which protects the mechanism and provides a pleasing appearance.

The disadvantage of the foregoing arrangement is that the user feels a very hard, metallic impact each time the lock lever drops in between teeth of the sector gear. This causes a very unpleasant, unnatural and irritating effect on the user.

SUMMARY OF THE INVENTION

By way of contrast, a preferred embodiment of the invention is a prosthetic elbow for amputees comprising first and second connector parts adapted to be connected to artificial upper arm and artificial lower arm, respectively, for the amputee. Means rotatably mounts the second connector part on the first connector part. A lock between the first and second connector parts comprises: a gear assembly having an outer gear part with gear teeth therein; a hub separate from and for the gear part; means rigidly connecting the hub to one of the connector parts; a resilient member connected to the gear part and the hub and providing therebetween a resilient mounting; a locking member; means for movably mounting the locking member on the other of the connector parts so as to enable selective engagement between the locking member and gear teeth to thereby stop rotation, through the resilient means, of the forearm connector part.

With this arrangement, the impact due to engagement of the lock is cushioned because of the resilient material. As a result, the undesirable and irritating feeling imparted to the amputee is substantially reduced and a more natural, or lifelike, feeling is given.

Preferably, the means for movably mounting the locking member comprises means for rotatably mounting the locking member onto the corresponding connector part.

A further preferred embodiment of the invention is one wherein the outer gear part and the hub each comprise a side facing in substantially the same direction and comprises means for rigidly affixing the resilient member to the sides of the outer gear part and hub.

A further preferred embodiment of the invention is one wherein the outer gear part and hub have spaced apart facing semi-circular edges.

An additional preferred embodiment comprises resilient material positioned in between the spaced edges.

An additional preferred embodiment is one wherein the resilient member has a portion thereof extending between the spaced edges.

A further preferred embodiment is one wherein the sides and edges have surfaces juxtaposed to surfaces of the resilient member and the means for affixing comprises a bonding between the juxtaposed surfaces.

The advantage of extending the resilient member in between the spaced edges is that it prevents the gear part from twisting relative to the hub to the extent that it becomes misaligned with the locking member when large forces are applied between the first and second connector parts.

Each of the above mentioned embodiments of the invention provides a very low cost shock absorbing system in the disclosed embodiment of the invention.

It will be recognized that the invention is especially suitable for use in the aforementioned positive lock-type elbow unit. However, within its broader concepts, the invention is useful in other types of elbow units where pivoting of one prosthetic limb part is to be locked with respect to a second prosthetic limb part.

BRIEF DESCRIPTION OF THE INVENTION

Figure 1:
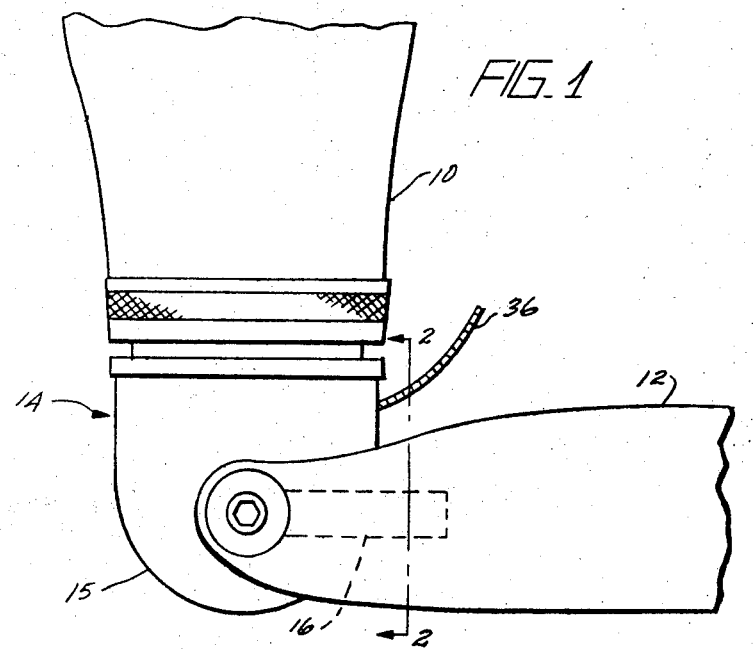
FIG. 1 is a side elevation view of a prosthetic elbow unit attached between a prosthetic upper arm and a prosthetic forearm and embodying the present invention.

Refer now to FIGS. 1 through 4. An upper prosthetic arm 10 is connected to a prosthetic forearm 12 through a prosthetic elbow unit 14. The prosthetic elbow unit 14 has a side connector part in the form of brackets 16 connected on opposite ends of a shaft 18. The side brackets 16 extend into the forearm 12 as indicated by dashed lines in FIG. 1 and thereby affix the forearm 12 to the shaft 18. The side brackets 16 and shaft 18 at the mating interface are either square or serrated (not shown) so that side brackets 16 do not rotate relative to the shaft 18.

Figure 2:
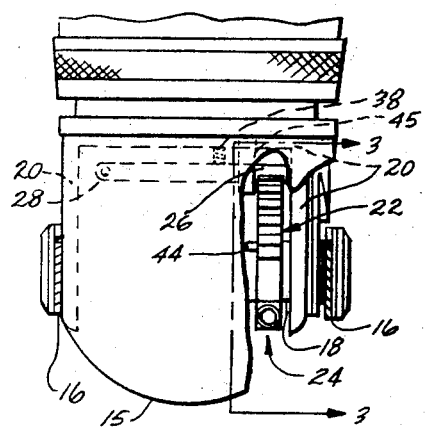
FIG. 2 is a front elevation view of the prosthetic elbow unit taken along the lines 2—2 of FIG. 1 with a portion of the cab broken away to reveal a portion of the interior of the prosthetic elbow unit. The stop shown in FIG. 3 and the forearm are not shown to reveal the important parts of the present invention.
Figure 3:
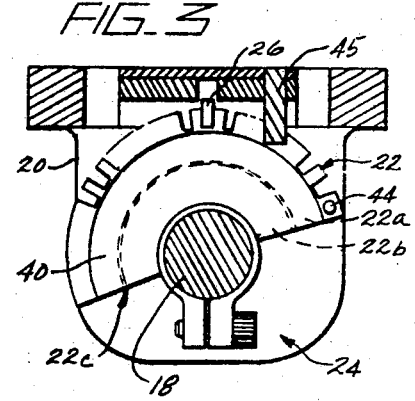
FIG. 3 is a section view of the prosthetic elbow unit taken along the lines 3—3 of FIG. 2.

An upper artificial arm 10 is molded in place on the end of the upper artificial arm connector part. The shaft 18 is rotatably mounted in bearings (not shown) in between the legs of a yoke-shaped mounting structure 20 (hereinafter referred to as "yoke"), thereby providing a pivoted connection for the brackets 16 and forearm 12 to the yoke 20. The brackets 16 and yoke 20 also form connector parts adapted by screw holes or the like (not shown) in a manner well known in the prosthetic limb art for connection to the forearm 12 and upper arm 10, respectively. A cap 15 is shown in FIGS. 1 and 2 covering the internal parts of the elbow 14.

Consider now the lock which may be selectively actuated to lock and prevent pivoting of the brackets 16 and forearm relative to the yoke 20. Mounted on the shaft 18 adjacent one of the legs of the yoke 20 is a locking part in the form of a sector gear 22. The sector gear 22 is clamped onto shaft 18 by a clamp 24. The interface between the sector gear 22 and the shaft 18 may also be serrated (not shown) in order to provide a positive connection between the shaft 18 and sector gear 22 and prevent relative rotation.

A locking part in the form of a lock lever 26 is pivotally mounted on a shaft 28. The shaft 28 is rotatably mounted on the yoke 20 by structure (not shown) so that one end of the lock lever drops in between two adjacent teeth on the sector gear 22. The sides of the lever 26 engage the sides of a slot in the yoke when pressure is applied by the sector gear 22. Cam 30 is rotatably mounted just below the lever 26 and is rotated by a ratchet lever 34 which in turn is connected to an elbow lock cable 36.

Figure 4:
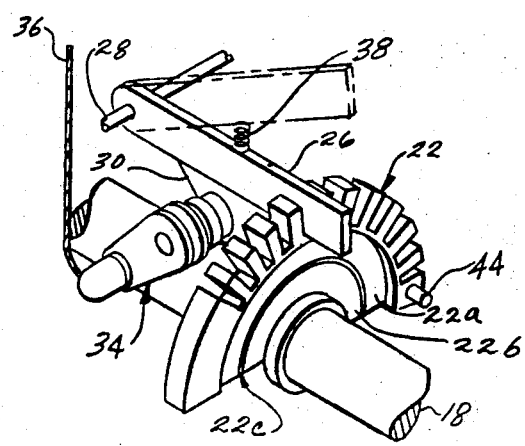
FIG. 4 is a schematic and pictorial representation of the sector gear, lock lever and camming mechanism, and embodying the present invention.

Actuation of the cable 36 actuates the ratchet 34 which in turn rotates the cam through a preselected angle to a position which forces the lock lever 26 out of engagement with the teeth of the sector gear 22 as shown by dashed lines in FIG. 4. Subsequent actuation of the ratchet lever 34 rotates the cam to a second position which allows the lock lever 26 to be returned to its position in between the teeth of the sector gear 22 as shown by solid lines in FIG. 4. A spring 38 pushes against lock lever 26 against the force of the cam 30 and normally forces the lock lever 26 into engagement in between the teeth of sector gear 22 when permitted by the position of the cam 30. A suitable ratchet and cam arrangement is disclosed in the above-identified book by Northrop Aircraft, Inc.

A metal stop pin 44 is affixed on the outer edge of the sector gear 22 and extends parallel with the shaft 28. A rectangular-shaped, resilient plastic, preferably nylon, member 45 is affixed on the yoke 20 and extends into an interfering position with stop pin 44 to stop rotation of sector gear 22 at an initial position.

Of particular importance to the present invention is the construction of the sector gear 22. The sector gear 22 has two locking parts. One is an outer gear part 22a with a convex, semi-circular portion having gear teeth and the other is an inner part or hub 22b which is affixed to the shaft 18. The inner part 22b and the outer part 22a are severed at the radius 22c depicted in FIG. 4. The shaft 18 and the inner and outer parts of the sector gear 22 are made of a hard metallic material, such as brass or steel. Significant to the present invention, the inner and outer portions of the sector gear 22 are interconnected by a substantially flat, semi-circular shaped portion of resilient material 40. The resilient material 40 may be rubber, plastic or other resilient material which is vulcanized, cemented or otherwise rigidly affixed in between the outer and inner portions of the sector gear 22.

With such an arrangement, whenever the lock lever 26 engages in between the teeth of the sector gear 22, the resilient material 40 will deflect, allowing the inner part 22b to rotate relative to the outer part 22a under the weight or load from use of the forearm 12, thereby serving as a shock absorber to substantially reduce the irritating metallic feeling that is otherwise transmitted to the user.

Figure 5:
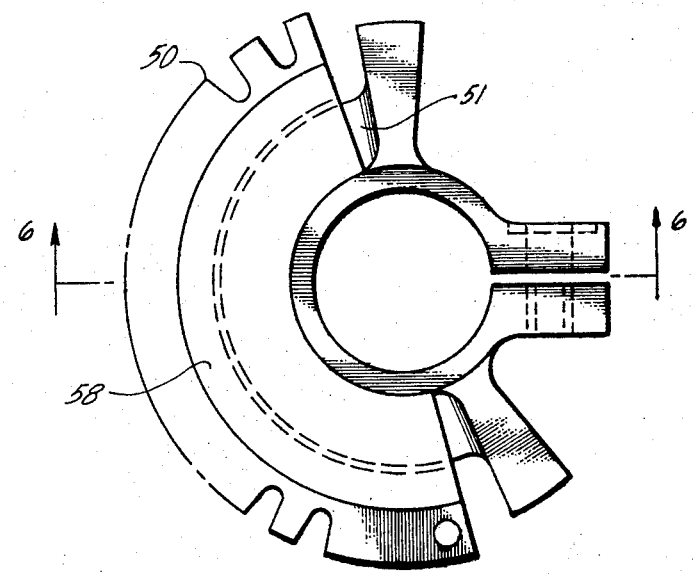
FIG. 5 is a preferred embodiment of the sector gear disclosed in FIGS. 2, 3 and 4.
Figure 6:
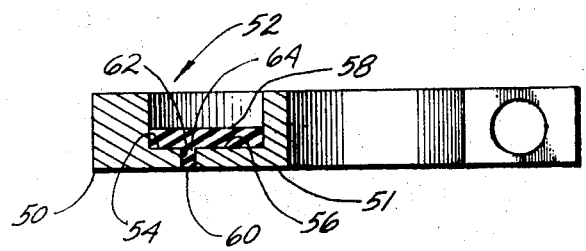
FIG. 6 is a cross-sectional view of the sector gear of FIG. 5 taken along the lines 6—6.

Referring to FIGS. 5 and 6, a gear assembly is shown having a gear part 50 for mounting on the shaft 18. The gear part 50 has a convex, semi-circular periphery with gear teeth therein. It should be noted that the teeth may take on different shapes and configurations within the scope of the claimed invention. The gear assembly also includes a hub 51. The gear part 50 and hub 51 have sides 54 and 56 which lie in the bottom of a recess 52 in a common plane, and face in the same direction. A resilient member 58 is affixed to the surfaces 54 and 56.

The gear part 50 and the hub 51 have spaced apart edges 60 and 62. The space between edges 60 and 62 is generally semi-circular and is such that as the gear part 50 is loaded, there will be space for the edges 60 and 62 to move relatively toward each other providing the desired amount of shock-absorbing action.

Preferably, the resilient member 58 has a portion thereof 64 extending in between the spaced apart facing edges 60 and 62. The portion 64 of the resilient material is important in that it aids in preventing the gear part 50 from moving to the extent that it becomes misaligned with the lever 26.

Preferably, the resilient member 58 has surfaces juxtaposed to the surfaces 54 and 56 and to the circular facing surfaces at the edges 62 and 60. These surfaces of the gear part 50 and the hub 51 are sandblasted and a vulcanizing bonding process is used to bond the juxtaposed surfaces of the resilient member and parts 52 and 51 together.

It will be evident to those skilled in the art that there are variations of the invention within the scope of the appended claims. For example, resilient material 40 may be made in the form of a hub and directly affixed to the shaft 18, using vulcanizing techniques or clamps to thereby eliminate the metallic hub or inner portion 22b.

What is claimed is:

1. A prosthetic elbow for an amputee comprising:
  an upper artificial arm connector part;
  a shaft rotatably mounted on the upper arm connector part;
  a lower artificial arm connector part rigidly connected to the shaft;
  means for locking the rotation of the shaft and lower arm connector part comprising:

a gear part mounted on the shaft for rotation therewith and having an outer convex, semi-circular periphery with gear teeth therein,
resilient means connected to said gear part and to said shaft providing therebetween a resilient mounting,
a locking member, and
means for movably mounting the locking member on the upper arm connector part so as to enable selective engagement between the locking member and the gear teeth to thereby stop rotation, through the resilient means, of the shaft and the lower arm connector part; and
cam means for disengaging said movable member from the gear teeth, and
means for normally urging the movable member into engagement with the gear teeth.

2. A prosthetic elbow for an amputee comprising:
a first connector part adapted to be connected to an artificial upper arm for the amputee;
a second connector part adapted to be connected to an artificial lower arm for the amputee;
means for rotatably mounting the second connector part on the first connector part;
means for locking the relative rotation of the first and second connector parts comprising:
a gear part having a convex, semi-circular periphery with gear teeth therein, resilient means,
means for rigidly affixing said resilient means to said second connector part and to said gear part and providing therebetween a mounting,
a locking member,
means for movably mounting the locking member on the first connector part so as to enable selective engagement between the locking member and the gear teeth to thereby stop rotation, through the resilient means, of the second connector part; and
means for moving the locking member into and out of engagement with the gear teeth.

3. A prosthetic elbow for an amputee comprising:
a first connector part adapted to be connected to an artificial upper arm for the amputee;
a second connector part adapted to be connected to an artificial lower arm for the amputee;
means for rotatably mounting the second connector part on the first connector part;
means for locking the rotation of the second connector part comprising:
a gear assembly comprising
an outer gear part having an outer convex, semi-circular periphery with gear teeth therein,
a hub separate from and for the gear part,
means for rigidly connecting the hub to the second connector part,
a resilient member connected to the gear part and to the hub and providing therebetween a resilient mounting,
a locking member,
means for movably mounting the locking member on the first connector part so as to enable selective engagement between the locking member and gear teeth to thereby stop rotation, through the resilient means, of the second connector part; and means for moving the locking member into and out of engagement with the gear teeth.

4. A prosthetic elbow according to claim 3 wherein said means for movably mounting the locking member comprises means for rotatably mounting the locking member onto the first connector part.

5. A prosthetic elbow according to claim 3 wherein said outer gear part and said hub each comprise a side facing in substantially the same direction and comprising means for rigidly affixing said resilient member to the sides of the outer gear part and hub.

6. A prosthetic elbow according to claim 5 wherein said outer gear part and hub have spaced apart facing semi-circular edges.

7. A prosthetic elbow according to claim 6 additionally comprising resilient material positioned in between said spaced edges.

8. A prosthetic elbow according to claim 6 wherein said resilient member comprises a portion thereof extending between said spaced edges.

9. A prosthetic elbow according to claim 8 wherein said sides and edges have surfaces juxtaposed to surfaces of said resilient member and said means for affixing comprises a bonding between said juxtaposed surfaces.

10. A prosthetic elbow for an amputee comprising:
a first connector part adapted to be connected to an artificial upper arm for the amputee;
a second connector part adapted to be connected to an artificial lower arm for the amputee;
means for rotatably mounting the second connector part on the first connector part;
means for locking the rotation between the first and second connector part comprising:
a gear assembly comprising
an outer gear part having an outer convex, semi-circular periphery with gear teeth therein,
a hub separate from and for the gear part,
means for rigidly connecting the hub to one of the connector parts,
a resilient member connected to the gear part and hub and providing therebetween a resilient mounting, the semi-circular periphery of said gear part being disposed substantially symmetrically about said shaft,
a locking member,
means for movably mounting the locking member on the other of the connector parts so as to enable selective engagement between the locking member and gear teeth to thereby stop rotation, through the resilient means, of the second connector part relative to the first connector part; and
means for moving the locking member into and out of engagement with the gear teeth.

11. A prosthetic elbow according to claim 10 wherein said means for movably mounting the locking member comprises means for rotatably mounting the locking member onto the corresponding connector part.

12. A prosthetic elbow according to claim 10 wherein said outer gear part and said hub each comprise a side facing in substantially the same direction and comprising means for rigidly affixing said resilient member to the sides of the outer gear part and hub.

13. A prosthetic elbow according to claim 12 wherein said outer gear part and hub have spaced apart facing semi-circular edges.

14. A prosthetic elbow according to claim 13 additionally comprising resilient material positioned in between said spaced edges.

15. A prosthetic elbow according to claim 13 wherein said resilient member comprises a portion thereof extending between said spaced edges.

16. A prosthetic elbow according to claim 15 wherein said sides and edges have surfaces juxtaposed to surfaces of said resilient member and said means for affixing comprises a bonding between said juxtaposed surfaces.

* * * * *